United States Patent

Murphy et al.

[11] 4,039,052
[45] Aug. 2, 1977

[54] BRAKE WITH INNER AND OUTER SWIVEL-MOUNTED SHOES

[75] Inventors: John H. Murphy, Salem; Joseph Treantos, Lynn, both of Mass.

[73] Assignee: Disk Brake Drum Company, Lynn, Mass.

[21] Appl. No.: 661,621

[22] Filed: Feb. 26, 1976

Related U.S. Application Data

[63] Continuation of Ser. No. 487,232, July 10, 1974, abandoned.

[51] Int. Cl.² .............................................. F16D 53/00
[52] U.S. Cl. ........................................ 188/76; 192/73
[58] Field of Search ............... 188/72.6, 72.9, 70 R, 188/73.3, 138, 234, 235, 236, 76, 250 F; 192/72, 73

[56] References Cited

U.S. PATENT DOCUMENTS

| | | | |
|---|---|---|---|
| 2,700,437 | 1/1955 | Murphy | 188/76 |
| 2,783,858 | 3/1957 | Murphy | 188/76 |
| 2,787,340 | 4/1957 | Murphy | 188/76 |
| 3,059,731 | 10/1962 | Gancel et al. | 188/72.6 |
| 3,332,518 | 7/1967 | North et al. | 188/72.6 |
| 3,760,909 | 9/1973 | Grove | 188/138 |
| 3,795,290 | 3/1974 | Hori et al. | 188/76 |
| 3,853,207 | 12/1974 | Rist | 188/76 |

*Primary Examiner*—Trygve M. Blix
*Assistant Examiner*—Edward R. Kazenske
*Attorney, Agent, or Firm*—Watts, Hoffmann, Fisher & Heinke Co.

[57] ABSTRACT

Inner and outer brake shoes are swivel-mounted on the arms of a yoke. When the yoke is rotated, the shoes move concurrently toward and away from inner and outer braking surfaces of a brake drum. The swivel mounting facilitates optimum seating engagement with the braking surfaces and in cases where the drum is warped, serves to maximize braking area and minimize wear. Stops positioned near opposite ends of the shoes limit their circumferential movement. An electric puck or a hydraulic actuator is used to rotate the yoke.

14 Claims, 3 Drawing Figures

BRAKE WITH INNER AND OUTER SWIVEL-MOUNTED SHOES

This is a continuation of application Ser. No. 487,232, filed July 10, 1974, now abandoned.

BACKGROUND OF THE INVENTION

1. Field of the Invention

The present invention relates generally to brakes for vehicles, and more particularly, to an improved brake employing inner and outer brakes shoes to grip inner and outer braking surfaces on a rotatable drum.

2. Prior Art

A number of proposals have been made in the prior art to employ inner and outer brake shoes operating concurrently on the inner and outer surfaces of a cylindrical brake drum. One such proposal is presented in U.S. Pat. No. 2,783,858 issued Mar. 5, 1957 to John H. Murphy.

One drawback of most of these proposals is that the freedom of movement of the brake shoes is restricted, typically to a pivotal motion. This restricted mounting does not permit the shoes to "float" or self-align with the drum when braking engagement is initiated. If the brake drum is warped from heat or out of warpage, the restricted mounting can reduce the area of braking engagement between the drum and the shoes, can cause undue and uneven wear on the brake shoes an drums, and can diminish the effective operating life of the shoes and the drum.

Another disadvantage of prior art proposals which pin or otherwise securely connect the brake shoes to a stationary mount is that these connections complicate assembly and disassembly of the brake. The connections add to the cost of the brake and provide additional areas which are subject to wear.

Still another disadvantage of prior brake proposals is that they include a relatively large number of parts, many if not most of which must be accurately formed and machined. Some of these parts must be made with close tollerances to assure their proper operation, and this adds significantly to the cost of the assembled brake.

SUMMARY OF THE INVENTION

The present invention overcomes the foregoing and other drawbacks of the prior art and provides a novel and improved brake including swivel mounted inner and outer shoes.

The shoes are carried on a yoke. The yoke has inner and outer arms which respectively overlie the inner and outer braking surfaces of a rotatable brake drum. The arms have rounded projections which extend toward the braking surfaces. The shoes are centrally engaged by the rounded projections and are held in such engagement by springs. This type of connection is advantageous in that it permits the shoes to swivel relative to the yoke, whereby the shoes can "float" into optimum braking engagement with the drum when the brake is applied.

Unlike most prior art proposals, no connection is made between a stationary structure and the brake shoes which would defeat the floating action of the shoes. The only interaction between the shoes and a stationary structure is provided by stops carried near opposite ends of the shoes to limit their circumferential movement once they are engaged with the drum.

In the preferred embodiment of the invention, the springs which hold the shoes on the arms of the yoke are wire springs which have opposite end regions connected to the shoes. Central portions of the springs are received in grooves on the arms of the yoke. This type of spring mounting has the advantages of being quite simple to make and to repair. It greatly simplifies assembly and disassembly of the shoes.

A significant advantage of brakes constructed in accordance with the present invention is their low manufacturing cost. The number of parts is minimal. Very little machining is required. The yoke is a forging which has a machined mounting stem. No machining is required in forming the shoes other than to drill two small holes in each shoe to receive opposite ends of the mounting spring. No machining is needed on the stops.

Another advantage is that the brake may be applied by rotating the yoke in either of two directions. This capability permits the brake to be electrically applied through the actuation of an electromagnetic puck that frictionally drags on the drum. When the drum is rotating in one direction, the puck rotates the yoke clockwise to apply the brake. When the drum is rotating in the other direction, the puck rotates the yoke counterclockwise to apply the brake.

Conventional hydraulic or mechanical actuators may also be used to rotate the yoke to effect brake application. In short, the brake is well adapted for use with almost any conventional type of actuation system.

As will be apparent from the foregoing, it is a general object to provide a novel and improved brake.

Other objects and a fuller understanding of the invention may be had by referring to the following description and claims taken in conjunction with the accompanying drawings.

DESCRIPTION OF THE PREFERRED EMBODIMENT

Figure 1:
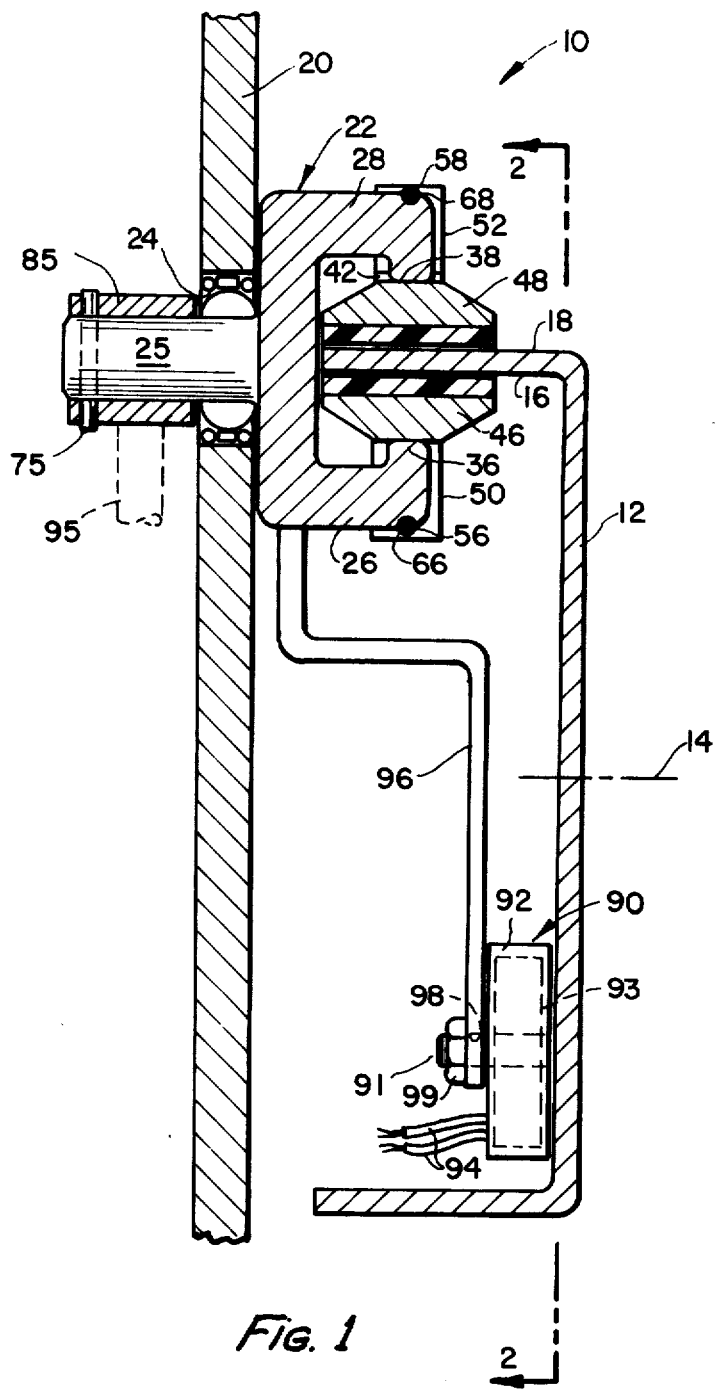
FIG. 1 is a cross-sectional view of an electrically actuated brake embodiment constructed in accordance with the present invention, as seen from the plane indicated generally by the line 1—1 in FIG. 2.
Figure 2:
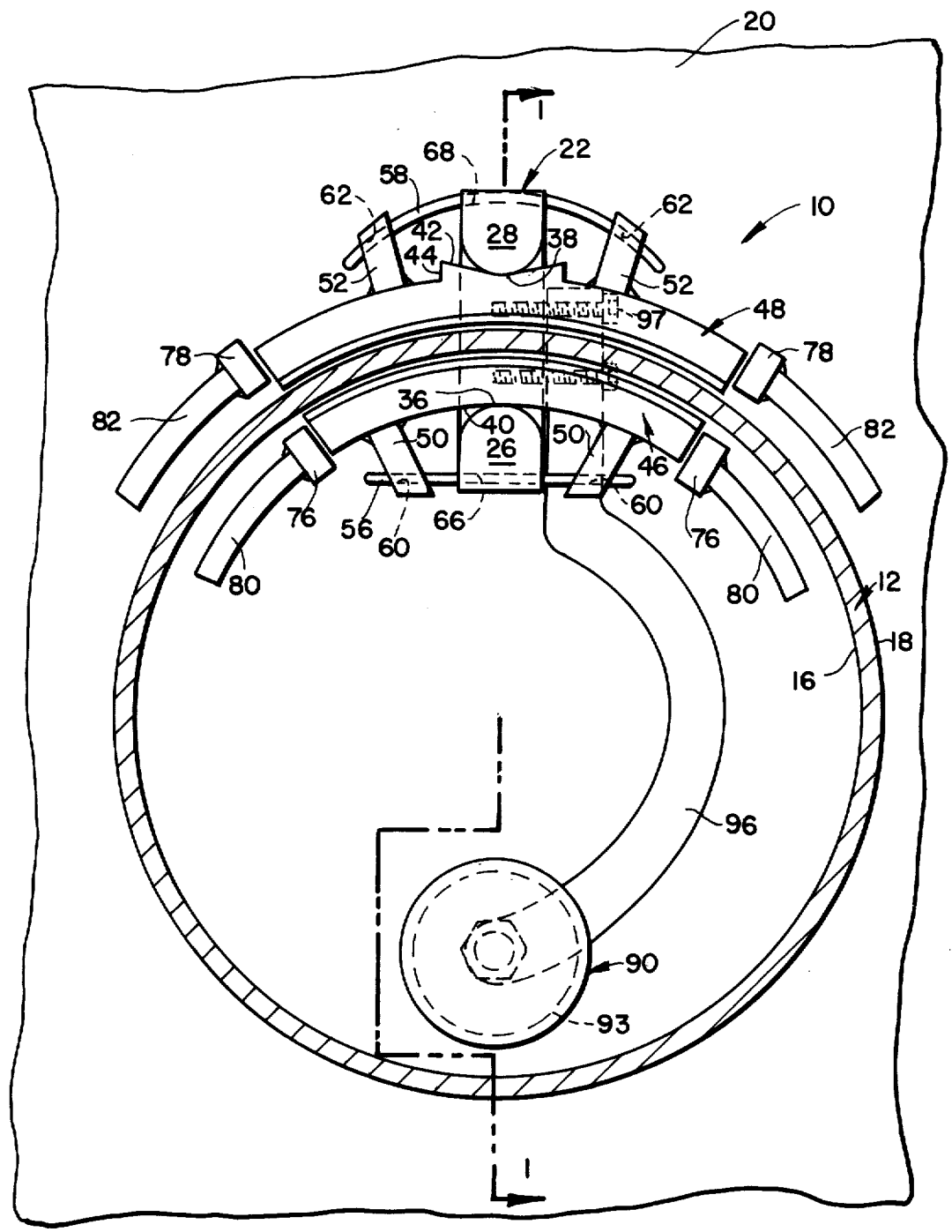
FIG. 2 is a cross-sectional view as seen from the plane indicated generally by the line 2—2 in FIG. 1.

Referring to FIGS. 1 and 2, a brake is shown generally at 10. The brake 10 includes a drum 12 which is rotatable about an axis indicated by the numeral 14. The drum 12 is of conventional flanged configuration, preferably formed from steel and having a cylindrical side wall including inner and outer braking surfaces 16, 18.

A stationary mounting plate 20 is positioned to the left of the drum 12 as viewed in FIG. 1, and behind the drum 12 as viewed in FIG. 2. In a typical installation, the mounting plate 20 is part of the frame of a vehicle, and the brake drum 12 is secured to a rotatable wheel.

A yoke 22 is rotatably carried on the mounting plate 20. A spherical bearing 24 is carried by the mounting plate 20. The yoke 22 is a forging which has a machined cylindrical stem 25. The stem 25 extends through and is journaled by the bearing 24. The yoke 22 has a pair of inner and outer arms 26, 28 which overlie the inner and outer braking surfaces 16, 18. Rounded projections 36, 38 formed on the distal ends of the arms 26, 28 extend toward the braking surfaces 16, 18.

An inner brake shoe 46 and an outer brake shoe 48 are carried on the arms 26, 28. The shoes 26, 28 are centrally engaged by the projections 36, 38. The inner arm projection 36 engages a concave inner surface 40 of the inner shoe 46. The outer arm projection 38 engages a concave recess 42 formed in an upstanding projection 44 on the outer surface of the outer shoe 48.

The shoes 46, 48 are held in engagement with the arms 26, 28 by a pair of springs 56, 58. The springs 56, 58 are wires formed from spring steel. A pair of depending ribs 50 are formed on the inner shoe 46. A pair of upstanding ribs 52 are formed on the outer shoe 48. Holes 60, 62 are drilled through the ribs 50, 52. Opposite end regions of the springs 56, 58 are received in the holes 60, 62. Notches 66, 68 are formed in the arms 26, 28 opposite the projections 36, 38. The central regions of the springs 56, 58 extend through the notches 66, 68.

The described spring-mounting of the shoes 46, 48 biases the shoes 46, 48 into engagement with the rounded projections 36, 38 and establishes swivel connections between the shoes 46, 48 and the arms 26, 28. When the shoes are brought into their brake-applied position as by rotating the yoke 22 about the axis of the stem 25, the shoes will "float" into optimum braking engagement with the drum surfaces 16, 18. If the drum is warped from heat or is out of round from wear, the swivel mounted shoes will maximize the surface area of contact with the drum thereby minimizing wear and prolonging the life of the brake.

The only restriction on the movement of the shoes 46, 48 imposed by a stationary structure is provided by inner and outer pairs of stops 76, 78 carried by the mounting plate 20. The stops 76, 78 are located near opposite ends of the shoes 46, 48 and serve to limit the circumferential movement of the shoes 46, 48 after they have engaged the braking surfaces 16, 18. The stops 76, 78 are preferably cast as integral parts of the mounting plate 20 and are provided with integral reinforcing ribs 80, 82.

A sleeve 85 is secured by a pin 75 to the yoke stem 25. As will be explained in conjunction with FIG. 3, an actuating lever 95 can be connected to the sleeve 85 to mechanically or hydraulically rotate the yoke 22 in applying the brake 10.

The brake actuation system shown in FIGS. 1 and 2 employs an electromagnetic puck 90. The puck 90 is of conventional design, including a mounting stem 91, and a housing 92 which carries an electromagnet 93. Electrical conductors 94 connect with the electromagnet 93.

The puck 90 is carried on a lever 96. The upper end region of the lever 96 is secured by threaded fasteners 97 to the yoke 22. The lower end region of the lever 96 is provided with an aperture 98 which receives the puck stem 91. A threaded fastener 99 secures the puck 90 to the lever 96.

When electricity is supplied through the conductors 94 to the electromagnet 93, the puck 90 is drawn into engagement with the drum 12 and frictionally drags on the inner face of the drum. If the drum 12 is rotating clockwise as viewed in FIG. 2, the drag of the puck 90 on the drum 12 will pivot the lower end of the lever 96 leftwardly causing the yoke 22 to rotate clockwise. If the drum 12 is rotating counterclockwise, the lower end of the lever will be moved rightwardly causing the yoke 22 to rotate counterclockwise. The yoke 22 is operative to move the shoes 46, 48 into braking engagement with the drum 12 regardless of the direction of its rotation by the lever 96.

Figure 3:
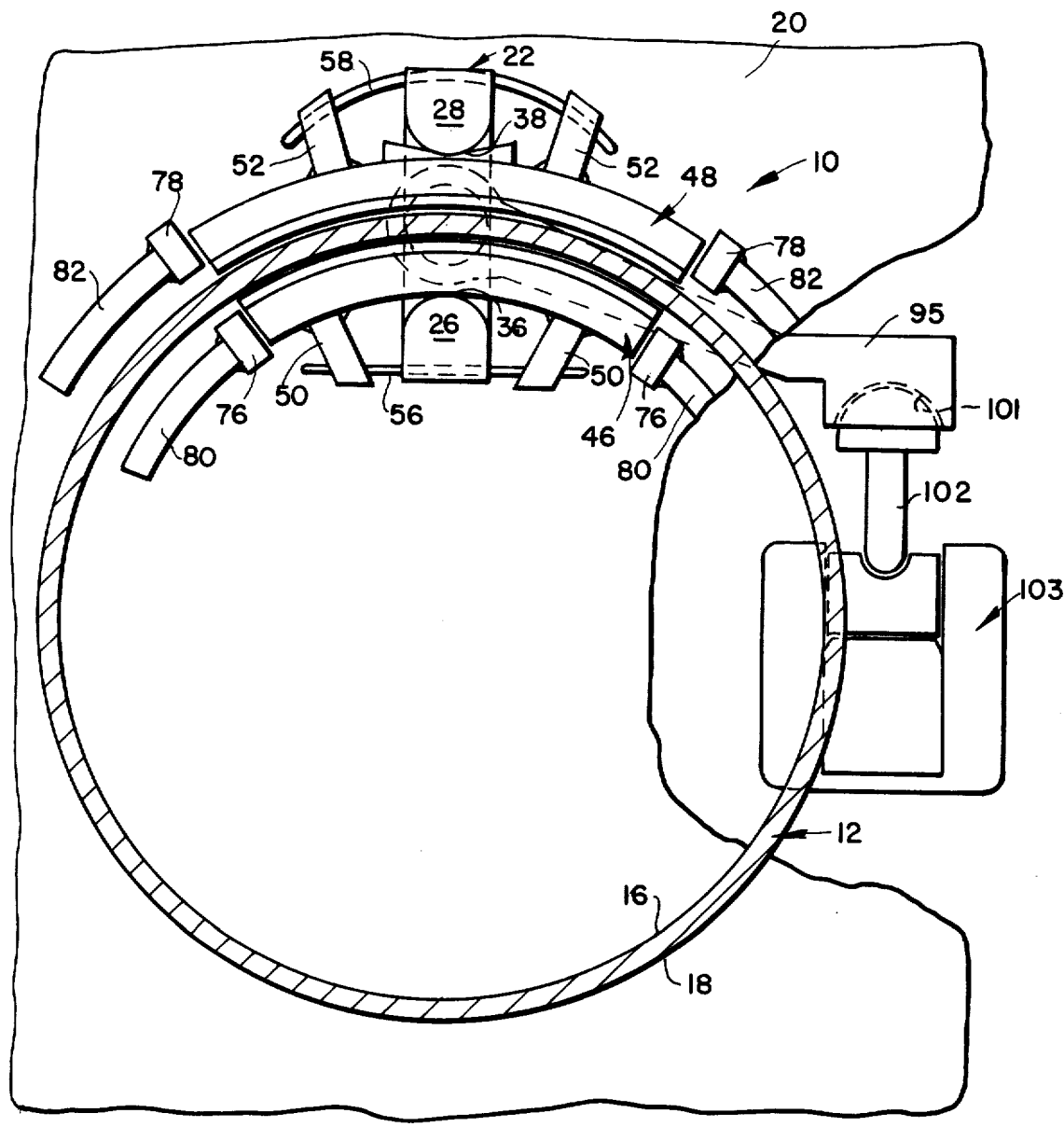
FIG. 3 is a cross-sectional view similar to FIG. 3 of a hydraulically actuated brake embodiment.

Referring to FIG. 3, a hydraulic brake actuation system is shown for rotating the yoke 22. A lever 95 has one end connected to the sleeve 85. The other end of the lever 95 has a concave recess 101. The upper end of a piston 102 extends into the recess 102. The lower end of the piston 102 is engaged by a hydraulic actuator 103 of conventional design. When hydraulic fluid under pressure is supplied to the actuator 103, the piston 102 moves upwardly causing the lever 95 to rotate the yoke counterclockwise to apply the brake 10.

As will now be apparent, the present invention provides a brake of extremely simple construction, employing a minimal number of parts which require a minimal amount of machining. There are no threaded fasteners or pins or other complicated connectors used to hold the brake shoes in place. Assembly and disassembly of the brake shoes is easily accomplished by slipping the shoes into and out of position on the arms 26, 28.

While only one set of brake shoes 46, 48 has been shown on the drum 12 in the drawings, one or more additional sets may be provided at other spaced locations around the perimeter of the drum to provide increased braking capability.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:
1. A brake comprising:
 a. a rotatable drum having a cylindrical wall defining inner and outer braking surfaces;
 b. a non-rotating structure positioned near said drum;
 c. a yoke movably carried by said structure and having spaced inner and outer arm members which respectively overlie said inner and outer surfaces, said yoke being movable between brake engaged and brake disengaged positions and being operable during such movement to concurrently move said arm members toward and away from said surfaces;
 d. an inner brake shoe member carried by said yoke and interposed between said inner arm member and said inner surface;
 e. an outer brake shoe member carried by said yoke and interposed between said outer arm member and said outer surface;
 f. first connection means establishing a swivel mounting between said inner shoe member and said inner arm member, and second connection means establishing a swivel mounting between said outer shoe member and said outer arm member;
 g. each of said connection means including a rounded projection formed on one of said members and extending into a concave recess formed on the other associated one of said members;
 h. each of said rounded projections having a radius of curvature which is substantially less than the radius of curvature of its associated concave recess to establish a rolling engagement when said yoke is moved between said brake engaged and disengaged positions, whereby said shoe members are caused to move circumferentially of the rotatable drum when said yoke is moved between said brake engaged and disengaged positions; and, i. stop means including inner and outer pairs of stops carried by said structure for permitting limited circumferential movement of said shoe members when said yoke is moved between said brake engaged and disengaged positions, said inner and outer stops being positioned near opposite ends of said inner and outer shoe members, respectively, and being spaced from the ends of their associated shoe members when said yoke is in said brake disengaged position.

2. The brake of claim 1 wherein said first connection means includes an inner biasing means biasing said inner shoe member into engagement with said inner arm member, and said second connection means includes an outer biasing means biasing said outer shoe member into engagement with said outer arm member.

3. The brake of claim 1 wherein said yoke is rotatably mounted on said structure and is operable when rotated clockwise as well as counterclockwise from said brake disengaged position to move said shoe members into braking engagement with said surfaces.

4. The brake of claim 1 additionally including a sperical bearing movably mounting said yoke on said structure.

5. A brake comprising:
  a. a brake drum defining cylindrical radially inner and outer braking surfaces entending about a central axis;
  b. a stationary structure positioned near said drum;
  c. mounting means pivotally carried by said structure for pivotal movement about an axis extending generally parallel to said central axis and defining spaced inner and outer arms which respectively overlie said inner and outer surfaces and which are movable in unison toward and away from said surfaces;
  d. inner and outer brake shoes supported on and carried respectively by said inner and outer arms for movement therewith into and out of braking engagement with said surface;
  e. first connection means establishing a swivel connection between said inner shoe and said inner arm, and second connection means establishing a swivel connection between said outer shoe and said outer arm;
  f. each of said connection means including a rounded projection extending into a concave recess;
  g. each of said rounded projections having a radius of curvature which is substantailly less than the radius of curvature of its associated concave recess to establish a rolling engagement between said arms and said shoes when said mounting means is moved between said brake engaged and disengaged positions, whereby said shoes are caused to move circumferentially of the rotatable drum when said mounting means is moved between said brake engaged and disengaging positions; and,
  h. stop means including inner and outer pairs of stops carried by said structure for permitting limited circumferential movement of said shoes when said mounting means is moved between said brake engaged and disengaged positions, said inner and outer stops being positioned near opposite ends of said inner and outer shoes, respectively, and being spaced from the ends of their associated shoes when said mounting means is in said brake disengaged position.

6. The brake of claim 5 wherein said mounting means includes yoke means rotatably carried by said structure and defining said arms.

7. The brake of claim 6 additionally including a sperical bearing movably mounting said yoke on said structure.

8. The brake of claim 5 wherein each of said connection means includes a biasing means respectively biasing its associated shoe into engagement with its associated arm.

9. A brake comprising:
  a. a flanged brake drum rotatable about an axis and having a cylindrical outer wall which defines on opposite sides thereof inner and outer braking surfaces;
  b. stationary structure positioned near said drum;
  c. a yoke having a stem which is rotatably mounted on said structure and having spaced inner and outer arms which respectively overlie said inner and outer surfaces, said yoke being rotatable from a brake disengaged centered position wherein said arms are aligned with a radius of said drum to a brake engaged position where said arms are positioned closer to said surfaces;
  d. an inner brake shoe;
  e. an outer brake shoe;
  f. first connection means swivel mounting said inner shoe on said inner arm for movement therewith toward and away from said inner surface;
  g. second connection means swivel mounting said outer shoe on said outer arm for movement therewith toward and away from said outer surfaces;
  h. each of said connection means including a rounded projection formed on a separate one of said arms and extending into a concave recess formed on an associated one of said shoes;
  i. each of said rounded projections having a radius of curvature which is substantially less than the radius of curvature of its associated concave recess to establish a rolling engagement between said projections and said shoes when yoke is moved between said brake engaged and disengaged positions, whereby said shoes are caused to move circumferentially of the rotatably drum when said yoke is moved between said brake engaged and disengaged positions; and,
  j. stop means including a pair of inner stops carried by said structure near opposite ends of said inner brake shoe and an outer pair of stops carried by said structure near opposite ends of said outer brake shoe for permitting limited circumferential movement of said shoes as said shoes are brought toward and into engagement with said surfaces, said stops being spaced from the ends of their associated shoes when said yoke is in said brake-disengaged centered position.

10. The brake of claim 9 additionally including an inner biasing means biasing said inner shoe into engagement with said inner arm, and an outer biasing means biasing said outer shoe into engagement with said outer arm.

11. The brake of claim 9 additionally including a spherical bearing movably mounting said yoke on said structure.

12. A brake comprising:
  a. a brake drum defining inner and outer braking surfaces;
  b. a stationary structure positioned near said drum;

c. yoke means rotatably carried by said structure and defining spaced inner and outer arms which respectively overlie said inner and outer surfaces and which are movable in unison toward and away from said surfaces;

d. inner and outer brake shoes carried respectively by said inner and outer arms for movement therewith into and out of braking engagement with said surface;

e. first connection means establishing a swivel connection between said inner shoe and said inner arm, and second connection means establishing a swivel connection between said outer shoe and said outer arm, said yoke means operable when rotated clockwise as well as counterclockwise from a position where said arms are spaced along a radius of said drum to move said shoes into braking engagement with said surfaces;

f. each of said connection means including a rounded projection extending into a concave recess;

g. each of said rounded projections having a radius of curvature which is substantially less than the radius of curvature of its associated concave recess to establish a rolling engagement between said arms and said shoes when said mounting means is moved between said brake engaged and disengaged positions, whereby said shoes are caused to move circumferentially of the rotatable drum when said mounting means is moved between said brake engaged and disengaging positions; and, h. stop means including inner and outer pairs of stops carried by said structure for permitting limited circumferential movement of said shoes when said mounting means is moved between said brake engaged and disengaged positions, said inner and outer stops being positioned near opposite ends of said inner and outer shoes, respectively, and being spaced from the ends of their associated shoes when said mounting means is in said brake disengaged position.

13. A brake comprising:

a. a support structure;

b. a brake drum rotatable with respect to said support structure about a first axis and defining inner and outer cylindrical peripheral braking surfaces;

c. a yoke member supported for pivotal movement with respect to said support structure and said drum about a second axis extending generally parallel to said first axis, said yoke member defining first and second arms projecting, respectively, along the inner and outer peripheral braking surfaces of said drum;

d. first and second brake shoes connected respectively to said first and second yoke arms;

e. an actuator for pivoting said yoke member about said second axis for moving said first and second shoes along arcuate paths about said second axis from brake-disengaged positions wherein said shoes are spaced radially from said respective braking surfaces to brake-engaging positions wherein said shoes engage said braking surfaces, each of said yoke arms imparting a brake-engaging force to each respective shoe which force has at least a component line of action extending generally tangent to said braking surfaces;

f. means for detachably connecting said shoes to said respective yoke arms comprising first structure enabling limited universal relative motion between said shoes and said arms to assure braking engagement between each shoe and its respective associated braking surface, and second structure comprising a member resiliently reacting directly between each shoe and arm for maintaining each shoe and arm assembled; and g. means for preventing brake locking comprising
  i. first stop means attached to said support at a location spaced circumferentially along said drum from the disengaged position of said first shoe, said first shoe moving toward engagement with said first stop means when moving to said brake-engaged position, said first stop means effective to engage said first brake shoe to limit the travel of said first brake shoe relative to said first yoke arm when the direction of motion of said peripheral braking surface and the direction of said component of the brake engaging force coincide; and,
  ii. second stop means attached to said support at a location spaced circumferentially along said drum from the disengaged position of said second shoe and from said first stop means, said second shoe moving toward engagement with said second stop means while moving toward said brake-engaged position and said second stop means effective to engage said second brake shoe to limit relative motion of said second shoe relative to said second yoke arm when the direction of motion of said braking surface and the direction of said component of the brake engaging force coincide.

14. A brake system having a brake drum defining cylindrical radially inner and outer braking surfaces rotatable about a first axis, a yoke member which is pivotable about a second axis extending generally parallel to said first axis, first and second brake shoes carried by projecting arms of said yoke member and engageable, respectively, with said surfaces, an actuator for pivoting the yoke member and moving the shoes about the second axis from brake-disengaged positions wherein said shoes are spaced from said surfaces to brake-engaged positions wherein said shoes engage said surfaces, connecting structure by which said arms and respective shoes are assembled comprising curved bearing surfaces coacting between each shoe and its associated arm to enable limited universal motion between said shoe and said arm and spring means reacting directly between each said arm and its respective shoe for resiliently maintaining said shoe assembled to said arm with said bearing surfaces engaged, and stationary stop elements spaced circumferentially apart relative to said drum, each shoe spaced from a respective stop element when in its brake-disengaged position and moving toward a respective stop element to engage its respective drum braking surface, said stop element engaging said shoe and limiting the engagement force between said shoe and said surface when the direction of movement of said surface and the direction of at least a component of the motion of said shoe toward its brake-engaged position coincide.

* * * * *